United States Patent Office 2,920,077
Patented Jan. 5, 1960

2,920,077

REACTION PRODUCTS OF CIS-1.2-DIAMINO CYCLOALKANES

Jakob Bindler, Riehen, near Basel, and Hans Schläpfer, Basel, Switzerland, assignors to J. R. Geigy A.-G., Basel, Switzerland, a Swiss firm No Drawing. Application October 18, 1956
Serial No. 616,609

Claims priority, application Switzerland October 25, 1955

5 Claims. (Cl. 260—268)

The invention concerns reaction products of cis-1.2-diamino cycloalkanes such as are obtained when these compounds are reacted with reactive derivatives of α-hydroxy fatty acids.

That 1.2-diamino cyclohexane, obtained according to Einhorn (Annalen der Chemie, 295, 211 (1897)), which is now termed trans-1.2-diamino cyclohexane, can be converted with excess chloracetic acid or with the salts thereof into 1.2-diamino cyclohexane-N.N'-tetraacetic acid is known. This latter compound is distinguished by its excellent ability to form complexes with earth alkali and heavy metal ions. On attempting to apply this reaction to cis-1.2-diamino cyclohexane, it was found that new reaction products having fundamentally different properties are obtained. For instance, on reacting excess chloracetic acid or the alkali salts thereof with cis-1.2-diamino cyclohexane in aqueous solution at 40–80° C. in the presence of buffer salts and while neutralising the acids liberated, solutions are obtained which have no, or only a very slight ability to form complexes with earth alkali and heavy metal ions. By precipitation and decomposition of the lead and copper salts, a dicarboxylic acid can be isolated out of these acidified solutions which has no complex forming powers. The properties and analysis of the compound prove that a 5.6-tetramethylene-2-ketopiperazine-1.4-diacetic acid is formed. Ketopiperazine compounds are also formed when no excess of chloracetic acid is used if the cis-1.2-diamino cyclohexane is replaced by its derivatives at the cyclohexane ring or by derivatives substituted by amino groups or by other cis-1.2-diamino cycloalkanes. Finally, ketopiperazine compounds are also obtained by using other reactive derivatives of α-hydroxy fatty acids, for example by using α-hydroxy fatty acid nitriles. Thus the piperazine ring is always closed before all hydrogen atoms of the two amino groups are replaced by α-carboxy or α-cyanalkyl radicals. When an α-hydroxy fatty acid nitrile is used as a reactive derivative of an α-hydroxy fatty acid, it is probable that on closing the ring in the first step, a 5.6-polymethylene piperazine-2-ketimide is formed. This is generally saponified under the reaction conditions while splitting off ammonia to form 5.6-polymethylene-2-ketopiperazine or, if not, it can easily be saponified.

Thus the invention concerns a process for the production of reaction products of cis-1.2-diamino cycloalkanes and consists in reacting such cis-1.2-diamino cycloalkanes as contain at least one hydrogen atom at each of the basic nitrogen atoms of the two amino groups with reactive derivatives of α-hydroxy fatty acids, possibly while converting modified carboxyl or carbonyl groups, under the conditions favourable thereto when closing the ring to form 2-keto-piperazine compounds.

Advantageously the cis-1.2-diamino cycloalkanes used according to the present invention contain 6 ring members but they may contain more or less. The hydroaromatic ring can be further substituted, e.g. by hydrocarbon radicals, halogen and alkoxy groups. This ring may also possibly contain endo ring members. Diprimary, primary-secondary or disecondary cis-1.2-diamino cycloalkanes can be used. Some of these cis-1,2-diamino cycloalkanes used according to the present invention are known, others can be obtained from cycloaliphatic α-halogen ketones by a method which consists in condensing while heating these halogen ketones with a urea which may, if desired, be organically monosubstituted. Imidazoline-2-ones are formed which contain in the 4.5-position a polymethylene radical which may be further substituted. These imidazoline-2-ones are hydrogenated to form the corresponding 1.2-cycloalkylene ureas; if necessary these are alkylated at the nitrogen atoms and the ureas are saponified to form cis-1.2-diamino cycloalkanes.

α-Halogen fatty acids or their salts, esters, anhydrides or halides can be used as reactive derivatives of α-hydroxy fatty acids, e.g. α-chloro- or α-bromo-acetic acid, -propionic acid, -butyric acid, -succinic acid, their salts and derivatives. However, also α-hydroxy fatty acid nitriles can be used, namely the cyanhydrines of aliphatic, araliphatic or cycloaliphatic carbonyl compounds such as formaldehyde cyanhydrine, acetaldehyde cyanhydrine, hydro-cinnamaldehyde cyanhydrine, acetone cyanhydrine, methyl ethyl ketone cyanhydrine, cyclohexane cyanhydrine etc., mixtures of such aliphatic, araliphatic or cycloaliphatic carbonyl compounds with hydrocyanic acid or its salts. By the expression "reactive derivatives of an α-hydroxy fatty acid" thus also cycloaliphatic α-hydroxy fatty acids and α-hydroxy fatty acids which may be aromatically substituted are to be understood, but advantageously an aromatic substituent should not be in the α-position to the possibly modified carboxyl group.

The reaction is performed preferably in solution, often with advantage in aqueous solution particularly when it is necessary to convert modified carboxyl or carbonyl groups such as carboxylic acid ester, cyano or carbimide groups by hydrolysis into the carboxyl or carbonyl group. The favourable conditions to close the ring to form ketopiperazines occur on heating the reaction mixture. A raised temperature also accelerates the saponification of the nitrilo groups to carboxyl groups or of carbimide groups to carbonyl groups while splitting off ammonia, it being advantageous for the medium to have an alkaline reaction. The amount of reactive derivatives of α-hydroxy fatty acids to be used depends on the composition of the end product desired. Of diprimary cis-1.2-diamino alkanes, in all 3 molecules can be bound to form 1.4 - bis - carboxyalkyl - 5.6-alkylene-2-ketopiperazines, or only 2 molecules can be bound to form 1- or 4-carboxyalkyl-5.6-alkylene-2-ketopiperazines or, finally, only 1 molecule can be bound to form 5.6-alkylene-2-ketopiperazines. Often more of these compounds are formed simultaneously. Correspondingly, primary-secondary cis-1.2-diamino cycloalkanes can bind 2 or 1 molecule(s) of a reactive derivative of an α-hydroxy fatty acid and disecondary cis-1.2-diamino cycloalkanes can bind only 1 molecule of a reactive derivative of an α-hydroxy fatty acid.

In general the new 5.6-alkylene-2-ketopiperazine compounds are well crystallised substances. They are valuable as intermediate products for the production of pharmaceuticals having a therapeutical action on the central nervous system, and for the production of textile auxiliary products and synthetic materials. Valuable plasticisers for polymeric synthetic materials such as polyvinyl chloride are obtained by esterification of the new compounds containing carboxyl groups with higher alcohols, e.g. with octyl alcohol, decyl alcohol or dodecyl alcohol; high molecular synthetic materials which are valuable as thermoplastic masses are obtained by esterifying the dicarboxylic acids with polyalcohols such as ethylene glycol, or by condensing them with aliphatic diamines such as 1.6-diaminohexane.

The following examples serve to illustrate the invention. Where not otherwise stated, parts are given as parts by weight and the temperatures are in degrees centigrade. The relationship of parts by weight to parts by volume is as that of kilogrammes to litres.

*Example 1*

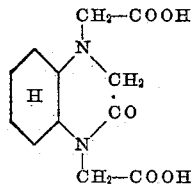

150 parts of monochloracetic acid are dissolved in 300 parts of water and neutralised with 212 parts of 30% caustic soda lye while cooling with ice at a temperature of at the most 10°. After adding 57 parts of cis-1.2-diamino cyclohexane the whole is warmed while stirring at 70–75° while 212 parts of 30% caustic soda lye are simultaneously added dropwise in such a manner that the reaction solution always has a weak phenolphthalein alkaline reaction. On completion of the addition, the solution, which has an alkaline reaction to mimosa paper, is heated for 5 hours at 90–95°, cooled to 45° and 192 parts of 30% hydrochloric acid are added while stirring. The solution, which is weakly acid to Congo red paper, is then heated for 1½–2 hours at 90–95°, cooled to 45° and the reaction is made acid to litmus paper with aqueous ammonia. After the addition of a solution of about 60 parts of copper sulphate crystals in 400 parts of water, the copper salt of 5.6-tetramethylene-2-ketopiperazine-1.4-diacetic acid begins to crystallise out of the dark blue solution. After stirring for several hours, the copper salt is isolated, washed with warm water and dried in the air. 79 parts of the copper salt of the composition $C_{12}H_{16}N_2O_5Cu + 3H_2O$ are obtained which corresponds to a yield of 41% of the theoretical.

This is converted into the free 5.6-tetramethylene-2-ketopiperazine-1.4-diacetic acid by pasting 77 parts of the copper salt in 800–1000 parts of water with the addition of 20 parts of sulphuric acid conc. and de-coppering in the warm with $H_2S$. After removing the sulphuric acid with the calculated amount of barium hydroxide, the solution, which has an acid reaction to Congo red paper, is evaporated whereupon the diacetic acid crystallises out. An almost quantitative yield of 5.6-tetramethylene-2-ketopiperazine-1.4-diacetic acid is obtained. Recrystallised from water, it decomposes at 198–200°.

To analyse the product, it is recrystallised twice from water and dried for 6 hours in the vacuum at 70°.

$C_{12}H_{18}O_5N_2$ (270.16). Calculated 53.30% C; 6.72% H; 10.37% N. Found 53.33% C; 6.84% H; 10.32% N.

The acid can be esterified with alcohols. The high boiling esters, e.g. the dioctyl ester, can be used as plasticisers in the plastics industry.

If the corresponding amount of cis-1.2-diamino cycloheptane is used instead of cis-1.2-diamino cyclohexane, then 5.6-pentamethylene-2-ketopiperazine-1.4-diacetic acid is obtained.

If, instead of cis-1.2-diamino cyclohexane, the corresponding amount of cis-1.2-diamino-4-methyl cyclohexane is used, then 5.6-(2'-methyl-tetramethylene)-2-ketopiperazine-1.4-diacetic acid is obtained.

*Example 2*

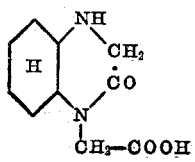

A solution of 189 parts of monochloracetic acid in 470 parts of water is carefully neutralised with 30% caustic soda lye while cooling with ice. After adding 114 parts of cis-1.2-diamino cyclohexane, the whole is heated at 70–75° while stirring and concentrated caustic soda lye is added dropwise simultaneously in such a manner that the reaction solution always has a phenolphthalein alkaline reaction. On completion of the reaction, the whole is then stirred for 4 hours at 90–95°. After this time, 250 parts of 30% hydrochloric acid are poured in slowly and the reaction solution is stirred for another hour at the same temperature. It is then diluted with 2500 parts of water and an excess of picric acid is added in the warm. This causes the picrate of 5.6-tetramethylene-2-ketopiperazine-1-acetic acid to quickly precipitate in the form of a yellow body. After cooling to about 30°, the product is filtered off under suction, washed with water and dried. Yield: 304 parts of picrate, corresponding to 69% of the theoretical. The picrate is obtained in a pure form by recrystallisation from water.

To convert the picrate into the free carboxylic acid, 265 parts of the recrystallised picrate are stirred in the warm for half an hour with a mixture of 500 parts of water and 700 parts of 37.3% hydrochloric acid. The mixture is cooled and the precipitated picric acid is isolated. Dissolved picric acid is removed from the hydrochloric acid filtrate by shaking out with ether and then the solution is evaporated to dryness in the vacuum and the free hydrochloric acid is completely removed. The residue remaining, the hydrochloride of carboxylic acid, is dissolved in water and the chlorine ions are precipitated with silver hydroxide. After removal of the silver chloride, a slight excess of silver is precipitated with $H_2S$, the silver sulphide is filtered off and the filtrate is evaporated whereupon the 5.6-tetramethylene-2-ketopiperazine-1-acetic acid crystallises out in the form of platelets containing crystal water. This latter is obtained in a pure form in over 90% yield by recrystallisation from water/alcohol and drying at 100–110°. It decomposes at 235–238°.

To analyse, it is again recrystallised from water/alcohol and dried for 14 hours in the vacuum at 100–110°.

$C_{10}H_{16}O_3N_2$ (212.15). Calculated 56.56% C; 7.60% H; 13.21% N. Found 56.70% C; 7.65% H; 13.0% N.

If cis-1-monomethylamino-2-amino cyclohexane or cis-1-monoethylamino-2-amino cyclohexane are used instead of cis-1.2-diamino cyclohexane, then a ketopiperazine carboxylic acid of the probable constitution:

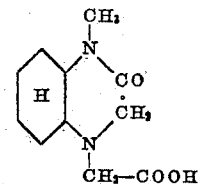

or

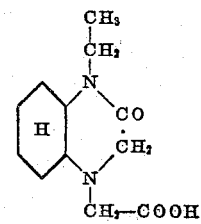

is obtained in a similar manner.

*Example 3*

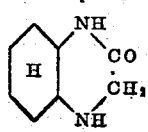

45 parts of cis-1.2-diamino cyclohexane are dissolved in 160 parts of water and 38 parts of monochloracetic acid are added to this solution. After heating for 8 hours on a water bath, 400 parts of 95% alcohol and then 100 parts of 40% sulphuric acid are added. Unreacted diamine immediately separates out in the form of difficultly soluble sulphate. After standing for a short time in the cold, the sulphate is filtered off under suction and the filtrate is washed with 50% alcohol. The alcoholic mother liquor is diluted with a little water, the reaction is made acid to litmus paper with aqueous ammonia and then it is concentrated until the salt separates out. Ammonia is added to the residue until the reaction is alkaline and the solution is thoroughly extracted with chloroform. After drying the chloroform extract over magnesium sulphate and distilling off the solvent, 22 parts of practically pure 5.6-tetramethylene-2-ketopiperazine are obtained.

The ketopiperazine is obtained in a purer form by recrystallisation from acetone, M.P. 138–139°.

$C_8H_{14}N_2O$ (154.13). Calculated 62.28% C; 9.16% H; 18.18% N. Found: 62.27% C; 9.40% H; 18.04% N.

α-Bromopropionic acid can be reacted in a similar manner to form 3-methyl-5.6-tetramethylene-2-ketopiperazine.

If in the above example instead of cis-1.2-diamino cyclohexane, the corresponding amount of cis-1.2-diamino cycloheptane is used, 5.6-pentamethylene-2-ketopiperazine is obtained.

*Example 4*

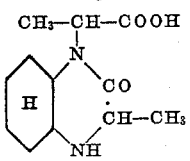

153 parts of 2-bromopropionic acid are dissolved in 200 parts of water and neutralised under ice cooling with 133 parts of 30.2% caustic soda lye. After adding 52 parts of cis-1.2-diamino cyclohexane, the whole is heated to 65–70° and a further 133 parts of 30.2% caustic soda lye are added dropwise in such a manner that the reaction solution always has a phenolphthalein alkaline reaction. It is then stirred for 4 hours at 90–95° to complete the reaction. 100 parts of 37.3% hydrochloric acid are then slowly added dropwise and the whole is stirred for one hour at the same temperature. The carboxylic acid, in the form of the picrate, can be obtained from the reaction solution obtained in the manner described in Example 2, and this can be converted into the free 3-methyl-5.6-tetramethylene-2-ketopiperazine-1-propionic acid. The compound in sufficiently pure form for analysis is obtained by recrystallising twice from water/alcohol. After drying in the vacuum at 100–110°, it melts at 213–215° with decomposition.

$C_{12}H_{20}O_3N_2$ (240.18). Calculated 59.95% C; 8.39% H; 11.66% N. Found: 59.71% C; 8.08% H; 11.70% N.

*Example 5*

22.8 parts of cis-1.2-diamino cyclohexane, 2 parts of caustic soda and 80 parts of water are boiled under reflux at 70–75° under reduced pressure and a solution of 10.5 parts of 95.1% sodium cyanide in 25 parts of water is added dropwise three times alternately with 16 parts of 37.5% formaldehyde which is also added dropwise. Finally, 3 further parts of 37.5% formaldehyde are added and then the whole is boiled for a further 4 hours until no more ammonia is given off. The pH value of the reaction solution is then adjusted to 4 with concentrated hydrochloric acid, it is heated to 90–95° for 2 hours and then brought to a volume of about 600 parts. The 5.6-tetramethylene-2-ketopiperazine-1-acetic acid formed can now be isolated by way of the picrate as described in Example 2. It melts at 235–238° with decomposition.

If instead of the mixture of alkali cyanide and formaldehyde, the corresponding amounts of glycol nitrile and alkali hydroxide are used, the same carboxylic acid is obtained in the same manner.

*Example 6*

A solution of 44 parts of glycol nitrile in 55 parts of water is added dropwise within 15 minutes at 20–30° to a solution of 84 parts of cis-1.2-diamino cyclohexane in 360 parts of water. After stirring for 6 hours at about 30°, the reaction solution is heated for 14 hours at 90–95°, whereupon it turns brown and ammonia is split off. The solution is then evaporated to dryness in the vacuum. The crystallised residue which remains is recrystallised from acetone and produces 93 parts of 5.6-tetramethylene-2-ketopiperazine which melts at 138–139°. It is identical to the product obtained according to Example 3.

The same result can be obtained with a mixture of hydrocyanic acid and formaldehyde instead of glycol nitrile.

If acetaldehyde cyanhydrine is used instead of glycol nitrile, then 3-methyl-5.6-tetramethylene-2-ketopiperazine is obtained in a similar manner.

If in the above example, butyrylaldehyde cyanhydrine is used instead of glycol nitrile, then 3-n-propyl-5.6-tetramethylene-2-ketopiperazine is obtained. M.P. 112–114°.

*Example 7*

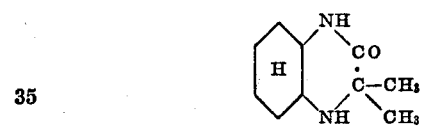

17 parts of acetone cyanhydrine are added dropwise at room temperature to a solution of 22.8 parts of cis-1.2-diamino cyclohexane in 100 parts of water. The solution, which is at first clear, quickly becomes cloudy and an oil is split off. After stirring for half an hour at room temperature, the dispersion is heated to 90–95° and stirred for another 8 hours at this temperature. The oil which had separated quickly goes into solution on warming and a great deal of ammonia is given off. The reaction solution is then evaporated to dryness in the vacuum and the yellow residue is recrystallised from acetone. A good yield of 3.3-dimethyl-5.6-tetramethylene-2-ketopiperazine is obtained which melts at 165–166°.

To analyse, it is again recrystallised from acetone and dried for 2 hours in the vacuum at 70°. M.P. 165–166°.

$C_{10}H_{18}ON_2$ (182.16). Calculated 65.88% C; 9.96% H; 15.38% N. Found 66.0% C; 9.98% H; 15.30% N.

If in the above process, 19.8 parts of methylethyl ketone cyanhydrine are used instead of 17 parts of acetone cyanhydrine, then 3-methyl-3-ethyl-5.6-tetramethylene-2-ketopiperazine is obtained which melts at 138–139°.

*Example 8*

Isolation of 5.6-tetramethylene-2-ketopiperazine-1-acetic acid from the 5.6-tetramethylene-2-ketopiperazine-1.4-diacetic acid which is also formed:

57 parts of cis-1.2-diamino cyclohexane are reacted as described in Example 1 with the sodium salt of chloracetic acid and the 5.6-tetramethylene-2-ketopiperazine-1.4-diacetic acid is isolated in the form of the copper salt. Yield 41%.

The filtrate and the washing water are united and the excess copper is precipitated by $H_2S$ in the warm. The de-coppered solution after being freed from dissolved $H_2S$ is brought to a pH value of 5 to 6 with caustic soda lye and picric acid is added according to Example 2, which causes the picrate of 5.6-tetramethylene-2-ketopiperazine-1-acetic acid to separate out. 80 parts (36.4%) are obtained by recrystallisation from water. Decomposition of the copper salt or the picrate according to Example 1 or 2 produces the corresponding ketopiperazine carboxylic acids.

What we claim is:
1. The compound of the formula:

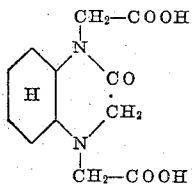

2. The compound of the formula:

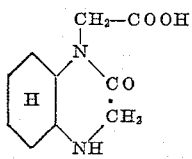

3. The compound of the formula:

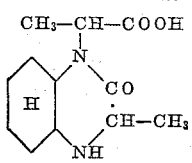

4. The compound of the formula:

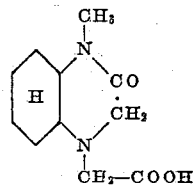

5. The compound of the formula:

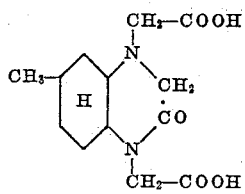

References Cited in the file of this patent

Aspinall: Jour. Amer. Chem. Soc., vol. 62, pp. 1202–1204 (1940).